June 12, 1956 A. S. LANGSDORF, JR 2,750,520
ELECTROSTATIC MEASURING DEVICE
Filed March 8, 1955 2 Sheets-Sheet 2

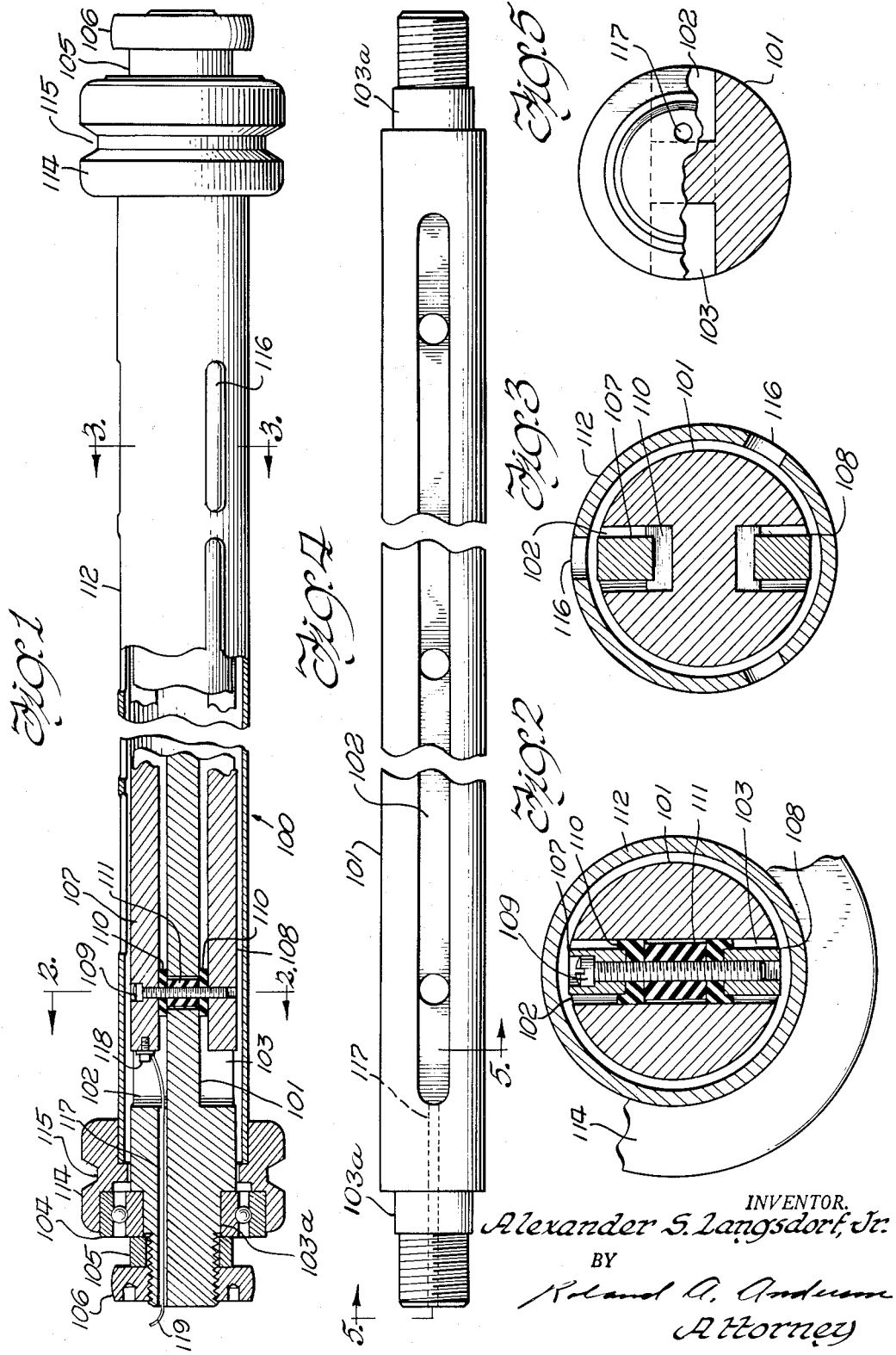

INVENTOR.
Alexander S. Langsdorf, Jr.
BY
Roland A. Anderson
Attorney

United States Patent Office 2,750,520
Patented June 12, 1956

2,750,520

ELECTROSTATIC MEASURING DEVICE

Alexander S. Langsdorf, Jr., Roselle, Ill., assignor to the United States of America as represented by the United States Atomic Energy Commission Application March 8, 1955, Serial No. 493,075

9 Claims. (Cl. 310—6)

This invention relates to devices for measuring electrostatic potentials and in particular to devices for measuring a plurality of electrical potentials existing at adjacent localities.

At the present time, it is common practice to use electrometers for measuring electrical potentials corresponding to electrostatic charges. Conventional electrometers may be connected to respond to either positive or negative electrostatic potentials; however, they are only responsive to the electrostatic charge existing in one restricted region. Some measurement situations, however, present the problem of measuring electrostatic potentials in more than one restricted region in a short period of time. This problem arises in industrial and research applications, and in particular in measuring the electrostatic charge generated by a Van de Graaff generator. The structure of the Van de Graaff generator is well known in the art and will not be discussed in detail beyond the fact that it comprises a movable belt suspended over two insulated rollers which are used to actuate the belt which is used to collect electrical charges. At the present time, a single measuring device is used for indicating the magnitude of the electrostatic charges on only one portion of the moving belt. This is inadequate since it is desirable to have an indication of the magnitudes of both the negative and the positive charges on the moving belt.

An object of this invention is to provide means for alternately measuring the magnitudes of electrostatic charges in a plurality of adjacent locations.

Another object of the invention is to provide a device for generating a voltage signal corresponding to the magnitudes of a plurality of electrostatic charges.

A specific object of the present invention is to provide a device for simultaneously measuring the potential magnitudes of the negative and positive charges present on a moving belt of a Van de Graaff generator.

The above-stated objects are attained in the present invention by providing a device comprising a stationary cylindrical member surrounded by a rotatable sleeve having a series of openings therein. By positioning the device between opposing halves of an electrostatically charged movable belt and by rotating the sleeve, the stationary member will be alternately exposed through the openings in the sleeve to the charges on both halves of the belt and will have different charges induced thereon. The magnitudes of the charges induced thereon are then measured by appropriate instruments to give an indication of the electrostatic charges present on both of the opposing portions of the movable belt.

These and further objects and advantages of the present invention will become apparent and will be better understood by reference to the following description in conjunction with the accompanying drawings, in which:

Fig. 1 shows one embodiment of an electrostatic measuring device partly in cross-section;

Fig. 2 is an enlarged cross-sectional view of the measuring device taken along the line 2—2 of Fig. 1;

Fig. 3 is an enlarged cross-sectional view of the measuring device taken along the line 3—3 of Fig. 1;

Fig. 4 is a plan view of a stationary component of the measuring device;

Fig. 5 is an end view, partly in cross-section, taken along the line 5—5 of Fig. 4;

Figure 6:
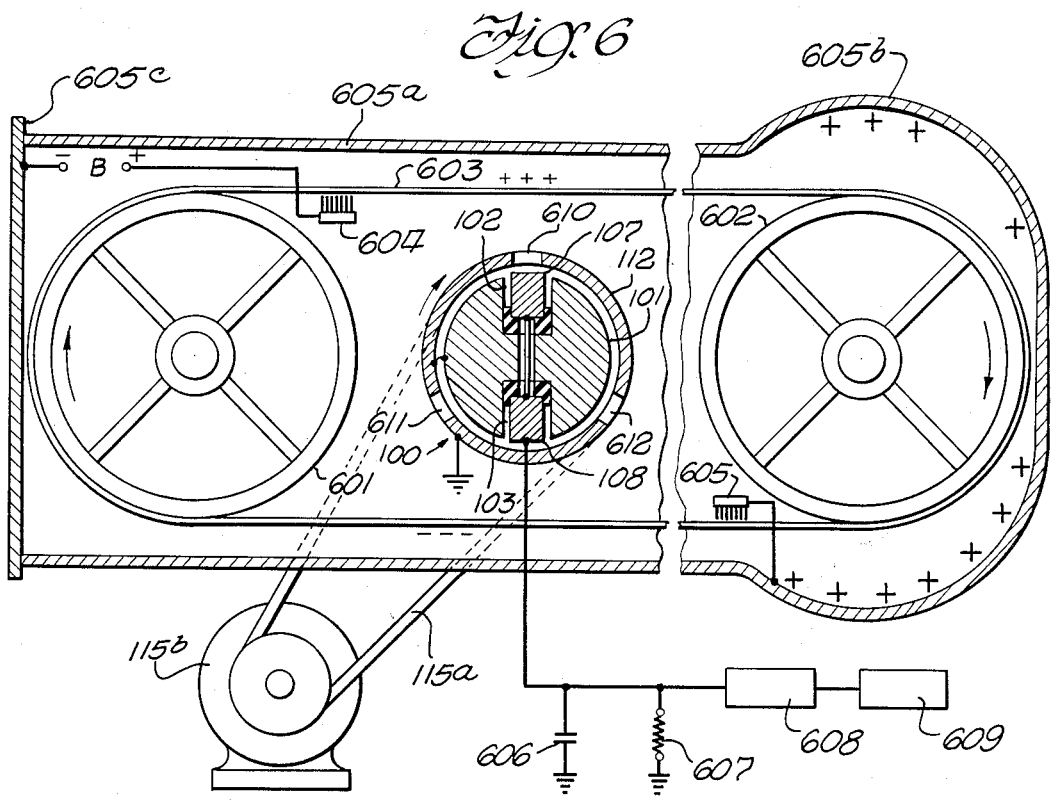
Fig. 6 represents a simplified schematic diagram of a Van de Graaff generator utilizing the electrostatic measuring device.

The structure of the electrostatic measuring device will be described in reference to Figs. 1, 2, 3, 4 and 5. The electrostatic measuring device 100 comprises a stationary member or stator 101 which is cylindrical in form and has two longitudinal slots therein, namely slots 102 and 103. The structure of the electrostatic measuring device 100 will be described in detail in reference to that portion of the device which is exposed in the fragmentary cross-sectional view of Fig. 1. It is to be understood that a symmetrically similar structure is contained in the portion of the electrostatic measuring device 100 which is not exposed by the fragmentary cross-sectional view. Each end of the stator 101 has a shoulder 103a cut along its periphery for the admission of a ball bearing 104. The ball bearing 104 is kept secure on the shoulder 103a by means of a retainer ring 105 and a nut 106 which is fastened on the threaded end of the stator 101. Within the slots 102 and 103 of the stator 101, there is located a pair of pickup bars or high voltage electrodes 107 and 108, respectively. The pickup bars 107 and 108 are made of a material which is a good electrical conductor. The pickup bars 107 and 108 are electrically insulated from the stator 101 by means of insulator washers 110 and insulator bushings 111. The pickup bars 107 and 108 are connected together by means of screws 109 which also serve to position the pickup bars 107 and 108 in the slots 102 and 103, respectively. An electrical connection is made to the pickup bar 107 from the outside by means of a wire lead 119 and a screw 118. The wire lead 119 is brought out through an opening 117 existing in one end of the stator 101. The movable portion of the electrostatic measuring device 100 comprises a rotor 112 which is a tubular sleeve made of an electrically conducting material having therein a plurality of slots or openings 116. The openings 116 are lined up in series along the longitudinal axis of the measuring device 100. The rotor 112 encompasses the stator 101 with a small clearance therebetween. The rotor 112 is mounted on the stator 101 by means of housings 114 at each end of the device 100. The housings 114 are mounted on the ball bearings 104 thereby enabling the rotor 112 to rotate about the stator 101. The housings 114 have grooves 115 cut along their outer peripheries for the purpose of engaging drive belts 115a to impart rotational motion to the rotor 112 from a motor 115b (Fig. 6). The series of openings 116 are spaced at intervals of 120° around the periphery of the rotor 112, as shown in Fig. 3. It is evident in this figure, that when the rotor 112 rotates about the stator 101, the pickup bars 107 and 108 will be intermittently exposed to any charge which may exist external to the electrostatic measuring device 100.

Referring to Fig. 6, a schematic diagram of a Van de Graaff generator utilizing the electrostatic measuring device 100 is shown. Essentially, the Van de Graaff generator comprises a pair of pulleys or rollers 601 and 602, constructed of electrically insulating material, cooperating together to impart linear motion to a belt 603. A set of discharge needles 604 and 605 are used for conducting electrostatic charges onto or from the moving belt 603. The entire moving mechanism is sheltered by a housing 605a which terminates in a corona cap 605b and is mounted to a base 605c. In the illustration, the discharge needles 604 are used for conducting electrons from the belt 603, and the discharge needles 605 are used to conduct electrons from the corona cap 605b to the belt 603. The device 100, which is of a length corresponding to the width of the belt 603, is electrically connected in a circuit as shown wherein the stator 101 is electrically connected to the rotor 116 and to ground. The pickup bars 107 and 108 are electrically connected to each other and are also electrically connected to ground by means of a parallel combination of a capacitor 606 and a resistor 607. The output of the pickup bars 107 and 108 is connected to an amplifier 608 which is connected to an indicating means 609, such as an oscilloscope or an A. C. voltmeter. The amplifier 608 and the indicating means 609 are conventional and need no further description. The connection existing between the rotor 112 and the stator 101 is obtained through the contacts of the housings 114 with the ball bearings 104. The motor 115b is used to impart rotational movement to the rotor 112 by means of the belt 115a. In the particular embodiment described herein, the motor runs at a speed of 1750 R. P. M. to rotate the rotor also at the same speed. The frequency of the voltage output of the device 100 is 3/2 this speed, or 2625 C. P. S.

Figure 7:
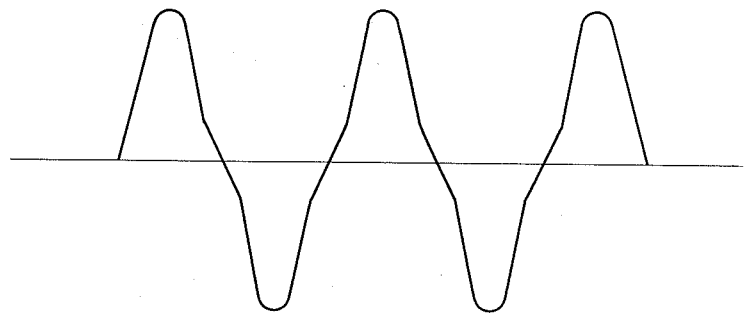
Fig. 7 shows the waveform output of the electrostatic measuring device while utilized in conjunction with the Van de Graaff generator, as shown in Fig. 6.

It is apparent that the high potential electrodes, namely the pickup bars 107 and 108, will produce an electrostatic field proportional in strength to the belt voltage to be measured. Assuming for the moment that the rotation of the rotor 112 is in a clockwise direction, as indicated by arrows in Fig. 6, the opening 610 will expose the electrode 107 to the positively charged portion of the belt 603 adjacent to said electrode. The charge induced in the electrode 107 will, therefore, be dependent upon the belt voltage adjacent thereto. The charge induced in the electrode 107 will be discharged through the resistor 607 as soon as the opening 610 begins to align itself with the slot 102. The rotor 112 seals off the electrode 108 from the negatively charged portion of the belt 603 during the period that the slot 610 is aligned with the slot 102. The voltage developed across the resistor 607 is amplified by the amplifier 608 to develop a signal which is transmitted to the oscilloscope 609. A moment later, as the rotor 112 continues to rotate, the opening 612 exposes the electrode 108 to the negatively charged portion of the belt 603 adjacent to said electrode while the rotor 112 simultaneously shields the electrode 107. During this period, the charge induced in the electrode 108 will discharge through the resistor 607. The voltage developed across the resistor 607 will be similarly amplified and then exposed to view on the screen of the oscilloscope 609. Shortly thereafter, the opening 611 finds itself aligned with the electrode 107 exposing it again to the positively charged portion of the belt 603. The charge induced in the electrode 107 subsequently discharges through the resistor 607 and thereby generates a signal which is amplified and transmitted to the indicating means 609. The net result of the intermittent exposure of the electrodes 107 and 108 to the charges on the belt 603 of the Van de Graaff generator is to produce a series of negative and positive pulses which are indicated by the oscilloscope, as shown in Fig. 7. This visual record of the magnitude and shape of the charges found on the positively and negatively charged portions of the belt 603 enables an operator to intelligently control the amount of charge disposed on the belt 603. The voltage indicated by the indicating means 609 is, of course, the induced voltage of the electrodes 107 and 108 as measured with respect to ground potential.

While there has been described what is at present considered to be the preferred embodiment of the invention, it will be understood that various modifications may be made therein, and it is intended in the appended claims to cover all such modifications as found within the true spirit and scope of the invention.

What is claimed is:
1. An electrostatic device for detecting charges comprising a cylindrical member of electrically conductive material, a pair of longitudinal slots disposed in opposed sides of the member and adapted to face at least two different charges, an electrode mounted within each slot and electrically insulated from the member, a cylindrical casing including an odd number of longitudinal openings therein encompassing said member, said openings being equally disposed about the periphery of the casing and adapted to expose the electrodes in alternate manner, and means for rotatively supporting said cylindrical casing in a concentric relationship to the member whereby the rotation of the casing will cause the slots therein to expose the electrodes alternately to the charges.

2. A device for measuring the magnitudes of a plurality of electrostatic charges comprising a central member including an insulated electrode extending radially therethrough, an outer member including an odd number of openings therein encompassing said central member, said openings being equally disposed about the periphery of the outer member and adapted to expose the electrode to the charges in alternate manner, means for moving said members relative to each other to expose the electrode on said central member through the openings in alternate manner to the electrostatic charges, and means for indicating the magnitude of each of said electrostatic charges.

3. A device for measuring electrostatic charges comprising a stationary member, an electrode mounted in said member and insulated therefrom, a movable member including an odd number of openings therein adapted to partially shield the electrode, said openings being equally disposed about the periphery of the movable member and adapted to expose the electrode to each of the charges in successive manner, and means for moving said movable member to intermittently expose the electrode through said openings to the electrostatic charges in successive manner, whereby a series of intermittent voltages are built up on the electrode, each voltage corresponding to a different charge.

4. An electrostatic device comprising, in combination, a Van de Graaff generator including a pair of rollers supporting a movable continuous belt therebetween and means for conducting electrical charges onto said belt, an electrode mounted between the rollers, movable means adapted to shield said electrode from the charges on the belt, a plurality of openings in the movable means, means for actuating said movable means to expose alternately said electrode to the charges on the two confronting portions of the belt, and means connected to the electrode to give an indication of the magnitude of the voltages induced by the charges on said electrode.

5. A device for measuring a plurality of electrostatic charges comprising a stationary cylindrical electrically conducting member having a plurality of longitudinal slots therein, an electrode mounted within each slot of the member and insulated therefrom, said electrodes being electrically connected to each other, a movable cylindrical member disposed about said stationary member and coaxial thereto, means for rotating said movable member with respect to said stationary member at a constant rate, said movable cylindrical member having an odd number of openings therein parallel to the axis thereof, said openings being equally spaced about the periphery of the cylindrical member and adapted to expose said electrodes during rotation in successive manner to the charges confronting each electrode, only one electrode being exposed at a given time, and means connected to the electrodes to indicate the voltages induced therein.

6. A device for measuring electrostatic charges comprising, in combination, a Van de Graaff generator including a charged belt, a slotted enlongated member, an electrode mounted within the slot of said member and insulated therefrom, a shielding member encompassing said elongated member and supported thereby, said shielding member having a series of openings therethrough adapted to expose the electrode, means for rotating said members relative to each other to expose the electrode alternately to the charges on the belt thereby charging said electrode in alternate manner, and circuit means connected to said electrode to indicate the magnitudes of the charges induced on the electrode.

7. An electrostatic device comprising a high potential electrode mounted on a grounded electrode and insulated therefrom, means for shielding the high potential electrode from the exterior including a plurality of charges to be measured, an odd number of openings in the shielding means, said openings being equally disposed in the shielding means and adapted to expose the high potential electrode to each of the charges in successive order, and means for moving the electrodes and the shielding means relative to each other, whereby the movement of said shielding means relative to the electrodes will intermittently expose the high potential electrode to electrostatic charges adjacent thereto for generating a voltage across said electrodes.

8. A voltage responsive device for measuring successively the magnitude of a plurality of electrostatic charges comprising, in combination, a high potential electrode, a movable shield for shielding the high potential electrode from the exterior, an odd number of elongated openings located around the periphery of the shield, said openings being equally disposed in the shield and adapted to expose the high potential electrode to the charges in successive manner, the number of the openings not corresponding to the number of charges in the vicinity of said device, means for actuating said movable shield to expose the high potential electrode through the openings in the shield in a successive manner to all of the electrostatic charges, and a current responsive device connected to said high potential electrode to indicate the magnitude of currents caused by each of the charges induced on the high potential electrode.

9. A device for measuring electrostatic charges comprising a stationary member, an electrode mounted on the member and insulated therefrom, and a movable member including a plurality of openings therein adapted to encompass the stationary member, said openings being equally disposed about the periphery of the movable member, only one opening at a time exposing the electrode to anyone charge, whereby a voltage charge is impressed on the electrode through the opening in line with the charge and the opening.

References Cited in the file of this patent

UNITED STATES PATENTS

| 1,283,492 | Frost | Nov. 5, 1918 |
| 2,201,388 | Curtis | May 21, 1940 |
| 2,588,613 | Burrill et al. | Mar. 11, 1952 |

FOREIGN PATENTS

| 1,052,215 | France | Sept. 23, 1953 |